United States Patent Office 3,697,380
Patented Oct. 10, 1972

3,697,380
LINCOMYCIN PRODUCTION
Alexander D. Argoudelis, Portage, John H. Coats, Kalamazoo, and Thomas R. Pyke, Portage, Mich., assignors to The Upjohn Company, Kalamazoo, Mich.
No Drawing. Filed Dec. 28, 1970, Ser. No. 102,141
Int. Cl. C12d 9/00
U.S. Cl. 195—80 R         3 Claims

ABSTRACT OF THE DISCLOSURE

A microbiological process for preparing the antibiotic lincomycin without the concomitant production of lincomycin B (4'-depropyl-4'-ethyllincomycin). The absence of lincomycin B in the fermentation beer results in increased lincomycin recovery efficiency from the fermentation beer.

BRIEF SUMMARY OF THE INVENTION

Lincomycin is a useful antibiotic produced by a fermentation process using the microorganism *Streptomyces lincolnensis* var. *lincolnensis*. In U.S. Pat. 3,086,912 there is described a fermentation and recovery process for the production of lincomycin, formerly known as lincolnensin. Lincomycin B, a nitrogenous base having the molecular formula $C_{17}H_{32}N_2O_6S$, is concomitantly produced in the lincomycin fermentation disclosed in U.S. 3,086,912. Though lincomycin and lincomycin B have activity against essentially the same spectrum of microorganisms, it is known that lincomycin B is significantly less active against said microorganisms, than is lincomycin. Accordingly, lincomycin is the preferred antibiotic.

The microbiological process of the subject invention comprises the use of a novel microorganism to produce lincomycin without the concomitant production of lincomycin B.

DETAILED DESCRIPTION OF THE INVENTION

The microorganism

The novel actinomycete used according to this invention for the production of lincomycin is *Streptomyces espinosus* Dietz, sp. n. One of its strain characteristics is the production of lincomycin without the concomitant production of lincomycin B. A subculture of this living organism can be obtained upon request from the permanent collection of the Northern Utilization and Research Division, Agricultural Research Services, U.S. Department of Agriculture, Peoria, Ill., U.S.A. Its accession number in this repository is NRRL 3890.

The microorganism of this invention was studied and characterized by Alma Dietz of the Upjohn Research Laboratory.

DESCRIPTION OF THE MICROORGANISM

*Streptomyces espinosus* Dietz, sp. n.

Color characteristics: Aerial growth gray-green. Melanin negative. Appearance on Ektachrome (2) is given in Table 1. Reference color characteristics are given in Table II. The culture may be placed in the Green (GN) and Gray (GY) color series of Tresner and Backus [Tresner, H. D., and E. J. Backus, 1962, Applied Microbiol. 11:353–338].

Microscopic characteristics: Sporophores short, straight to flexuous, to open spiral (RF, RA) in the sense of Pridham et al. [Pridham, T. G., C. W. Hesseltine, and R. G. Benedict, 1958, Applied Microbiol. 6:52–79]. Spores mostly spherical; many with a distinct leakage. Spore surface thorny to spiny with appearance of transition to hairy on some spines. Spines profuse and patterned when observed on spores treated by the carbon replica method of Dietz and Mathews [Dietz, A., and J. Mathews, 1968, Applied Microbiol. 10:258–263; Applied Microbiol. 16:935–941 (1968)], Cultural and biochemical characteristics: See Table III.

Carbon utilization: Growth of the culture on carbon compounds was determined in the synthetic medium of Pridham and Gottlieb [Pridham, T. G., and D. Gottlieb, J. Bacteriol. 56:107–114 (1948)] and in their modified medium [Shirling, E. B., and D. Gottlieb, International Journal of Systematic Bacteriology 16:313–340 (1966)]. In the former, the culture showed slight growth on the control, inulin, dulcitol, D-sorbitol, phenol, sodium oxalate, sodium tartrate, and sodium succinate; moderate growth on sucrose, raffinose, salicin, and sodium acetate; good growth on D-xylose, L-arabinose, rhamnose, D-fructose, D-galactose, D-glucose, D-mannose, maltose, lactose, cellobiose, dextrin, soluble starch, glycerol, D-mannitol, and inositol, no growth on cresol, sodium formate, and sodium salicylate. In the modified medium there was slight growth on the negative control (no control (glucose). Growth was equal to or better than the glucose control on L-arabinose, D-xylose, inositol, D-mannitol, D-fructose, rhamnose and cellulose (one of two plates). There was no growth on sucrose or raffinose.

Temperature: Growth was fair at 18° C., 45° C.; good at 25° C., and heavy at 28–37° C. on Bennett's, Czapek's sucrose, and maltose-tryptone agars.

*S. espinosus* is readily distinguished from the lincomycin-producer *Streptomyces lincolnensis* var. *lincolnensis* [Mason, D. J., A. Dietz, and C. DeBoer, 1962, Lincomycin, A New Antibiotic. I. Discovery and Biological Properties, Antimicrobial Agents and Chemotherapy, pp. 554–559]. The new culture has gray-green aerial growth, is melanin-negative, has short, straight to open spiral sporophores bearing round, thorny to spiny to hairy spores, does not solubilize xanthine, and grows at 45–55° C. as well as at lower temperatures. *S. lincolnensis* has a pale pink aerial growth, is melanin-positive, has long straight to flexuous sporophores bearing restangular smooth spores with fine surface detail, solubilizes xanthine and has no growth to trace growth at 45–55° C.

*S. espinosus* is distinguished from other members to the limited "green" group of Streptomyces by its production of the antibiotic lincomycin, by its rapid growth and formation of a gray-green aerial mycelium, its distinctive white aerial growth on peptone-iron agar, its growth at 18–55° C. and its distinctive round spores with thorny to spiny to hairy surface. (Cultures in the Viridis Series of Waksman [Waksman, S. A., 1961, The Actinomycetes, vol. 2, Classification, Identification, and Descriptions of Genera and Species, The Williams & Wilkins Co., Baltimore] and Baldacci [Baldacci, E., 1958, Development in the Classification of Actinomycetes, Giornale di Microbiologia, 6:10–27]: the prasinus color group of Ettlinger et al. [Ettlinger, L., R. Corbaz and R. Hütter, 1958, Zur Systematik der Actinomyceten, 4, Eine Arteinteilung der Gattung Streptomyces Waksman et Henrici. Archiv. für Mikrobiologie, 31:326–358], the prasinus-odor azureus-glaucus-group of Hütter [Hütter, R., 1967, Systematik der Streptomyceten unter besondere Berücksictigung der von ihnen gebildeten Antibiotica, S. Karger, Basel], the malachiticus group of Küster [Küster, E., 1970, Note on the Taxonomy and Ecology of *Streptomyces malachiticus* and Related Species, International Journal of Systematic Bacteriology, 20:25–29], the green-spore color group X of Kutzner [Kutzner, H. J., 1956, Beitrag zur Systematik und Okologie der Gattung Streptomyces Waksm. et Henrici. Diss. Landw. Hocksch. Hokenhein.], and the prasinomycin producers of Myers et al. [Myers, E., G. J. Miraglia, D. A. Smith, H. L Basch, F. E. Pansy, W. H. Trejo, and R. Donovick, 1968, Biological Characterization of Prasinomycin, a Phosphorus-Containing Antibiotic, Appl. Microbiol. 16:603–608].)

*Streptomyces espinosus* can be distinguished from named species in the Upjohn culture collection and from those described in the literature by its distinctive color pattern, sporophore and spore type and its ability to produce lincomycin. It is proposed that the new soil isolate be designated *Streptomyces espinosus* Dietz, sp. n. and that this type species be designated the type variety *Streptomyces espinosus* var. *espinosus* in accordance with Rule 9d(2) of the International Code of Nomenclature of Bacteria [Intern. J. System. Bacteriol. 16:459–490 (1966)].

The characteristics of *Streptomyces espinosus* Dietz, sp. nov., NRRL 3890, are given in the following tables:

Table I.—Appearance of *Streptomyces espinosus* on Ektachrome.
Table II.—Reference Color Characteristics of *Streptomyces espinosus*.
Table III.—Cultural and Biochemical Characteristics of *Streptomyces espinosus*.

TABLE I.—APPEARANCE OF *STREPTOMYCES ESPINOSUS* ON EKTACHROME [1]

| Agar medium | Surface | Reverse |
|---|---|---|
| Bennett's | Gray-green | Pale yellow-tan. |
| Czapek's sucrose | do | Pale gray. |
| Maltose-tryptone | do | Yellow-tan to olive. |
| Peptone-iron | White | Yellow. |
| 0.1% tyrosine | Colorless | Red. |
| Casein starch | Gray-green | Pale gray-green. |

[1] Dietz, A., "Ektachrome Transparencies as Aids in Actinomycete Classification," Annals of the New York Academy of Sciences, 60:152–154, 1954.

TABLE II.—REFERENCE COLOR CHARACTERISTICS OF *STREPTOMYCES ESPINOSUS*

| Agar medium | | Color Harmony Manual, 3rd Edition, 1948 [1] | ISCC-NBS method of designating color and a dictionary of color names, circular 553, 1955 [2] |
|---|---|---|---|
| Bennett's | S | 1½ge light olive gray<br>1ge citron gray<br>2ec biscuit, ecru, oatmeal, sand | 109gm light grayish olive.<br>Do.<br>90gm grayish yellow. |
| | R | | |
| | P | 2ig slate tan | 110g grayish olive, 112m light olive gray. |
| Czapek's sucrose | S | do | Do. |
| | R | | |
| | P | 1½ge light olive gray<br>1ih olive gray | 109gm light grayish olive.<br>112m light olive gray; 113g olive gray; 127g grayish olive green. |
| Maltose tryptone | S | 2ge bamboo, chamois<br>1½ge light olive gray | 90gm grayish yellow.<br>109gm light grayish olive. |
| | R | | |
| | P | 2ih dark covert gray<br>1ih olive gray | 112m light olive gray, 113g olive gray.<br>112m light olive gray, 113g olive gray, 127g grayish olive green. |
| Yeast extract-malt extract (ISP-2) | S | 2ge bamboo, chamois<br>2ie light mustard tan | 90 gm grayish yellow.<br>91gm dark grayish yellow, 94g light olive brown, 106g light olive. |
| | R | | |
| | P | | |
| Oatmeal (ISP-3) | S | 1½g olive gray<br>2ie covert gray<br>1½ge light olive gray<br>2ec biscuit, ecru, oatmeal, sand | 94g light olive brown, 112gm light olive gray.<br>109gm light grayish olive.<br>90gm grayish yellow. |
| | R | | |
| | P | 3ih beige gray, mouse<br>1ih olive gray | 113g olive gray, 265m medium gray.<br>112m light olive gray, 113g olive gray, 127g grayish olive green. |
| Inorganic-salts starch (ISP-4) | S | 2ge bamboo, chamois<br>2ec biscuit, ecru, oatmeal, sand | 90gm grayish yellow.<br>Do. |
| | R | 2ik dark covert gray<br>2ie covert gray | 112m light olive gray, 113g olive gray.<br>94g light olive brown, 112gm light olive gray. |
| | P | | |
| Glycerol-asparagine (ISP-5) | S | 2ge covert tan, griege<br>2ge covert tan, griege | 90gm grayish yellow.<br>Do. |
| | R | | |
| | P | | |

[1] Jacobson, E., W. C. Granville, and C. E. Foss, 1948. Color Harmony Manual, 3rd. Ed., Container Corporation of America, Chicago, Illinois.
[2] Kelly, K. S., and Judd, D. B., 1955. The ISCC-NBS Method of Designating Colors and a Dictionary of Color Names, U.S. Department of Comm. Circ. 553.

NOTE.—S=Surface; R=Reverse; P=Pigment.

TABLE III.—CULTURAL AND BIOCHEMICAL CHARACTERISTICS OF *STREPTOMYCES ESPINOSUS*

| Medium | Surface (aerial growth) | Reverse | Other characteristics |
|---|---|---|---|
| Agar media: | | | |
| Peptone-iron | Gray-white in center; green on edge | Yellow | Melanin-negative. |
| Calcium malate | Fair to good gray-green | Pale gray | Malate not solubilized. |
| Glucose-asparagine | Gray-white to gray-yellow | Light cream to cream | |
| Skim milk | Light gray-green-yellow to gray-green-pink | Deep yellow to yellow-tan | Yellow to yellow-tan pigment; casein solubilized. |
| Tyrosine | Heavy gray-green | Red brown | Red brown pigment; tyrosine solubilized. |
| Xanthine | Good gray-green to good only on periphery | Pale yellow to pale yellow-green | Xanthine not solubilized. |
| Nutrient starch | Good gray-green | Pale olive | Starch hydrolyzed. |
| Yeast extract-malt extract | Heavy gray-green | Pale yellow-tan | |
| Bennett's | Heavy gray-green | Olive | |
| Czapek's sucrose | Good gray-green | Gray-green | |
| Maltose tryptone | Good gray-green with white to heavy gray-green | Olive | |
| Peptone-yeast extract-iron (ISP-6) | Pale pink | Yellow-tan | Melanin-negative. |
| Tyrosine (ISP-7) | Gray-green with white to gray-green | Pale yellow-green | Melanin-negative. |
| Gelatin media: | | | |
| Plain | | | Colorless vegetative growth; liquefaction ¼-½. |
| Nutrient | | | White aerial growth on surface pellicle; liquefaction ¼-½. |
| Broth media: | | | |
| Synthetic nitrate | | | Pink cream aerial growth on surface pellicle; flocculent growth at base; growth throughout medium; nitrate not reduced to nitrite. |
| Nutrient nitrate | | | Trace green aerial growth on yellow; vegetative growth of surface pellicle; flocculent growth at base; yellow-pigment; neither nitrate nor nitrite present. |
| Litmus milk | | | Cream to green to gray-green on yellow to gray-green vegetative ring; litmus reduced; peptonization ¼ pH 7.5-7.9. |

Lincomycin is produced by the novel microorganism of the subject invention when said microorganism is grown in an aqueous nutrient medium under submerged aerobic conditions. It is to be understood also that for the preparation of limited amounts surface cultures and bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeast, autolyzed brewer's yeast with milk solids, soybean meal, cottonseed meal, cornmeal, milk solids, pancreatic digest of casein, distillers' solids, animal peptone liquors, meat and bone scraps, and the like. Combinations of these carbon and nitrogen sources can be used advantageously. Trace metals, for example, zinc, magnesium, manganese, cobalt, iron, and the like, usually need not be added to the fermentation media since tap water and unpurified ingredients are used as media components.

Production of lincomycin by the process of the invention can be effected at any temperature conducive to satisfactory growth of the novel microorganism, for example, between about 18° and 40° C., and preferably between about 20° and 32° C. Ordinarily, optimum production of lincomycin is obtained in about 2 to 10 days. The medium normally remains basic during the fermentation. The final pH is dependent, in part, on the buffers present, if any, and in part on the initial pH of the culture medium.

When growth is carried out in large vessels and tanks, it is preferable to use the vegetative form, rather than the spore form, of the microorganism for inoculation to avoid a pronounced lag in the production of lincomycin and the attendant inefficient utilization of the equipment. Accordingly, it is desirable to produce a vegetative inoculum in a nutrient broth culture by inoculating this broth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of lincomycin, as long as it is such that a good growth of the microorganism is obtained.

The microorganism of the subject invention can also be grown in the media and under the conditions disclosed in U.S. Pat. 3,086,912. Further, the lincomycin compound produced by the subject process can be recovered by the procedures disclosed in U.S. Pat. 3,086,912.

In a preferred recovery process, lincomycin is recovered from its culture medium by separation of the mycelia and undissolved solids by conventional means, such as by filtration and centrifugation. Lincomycin is then recovered from the filter or centrifuged broth by extraction with a water-immiscible organic solvent in which lincomycin is soluble, for example, 1-butanol, methyl ethyl ketone, benzene, and methylene chloride (preferred). Advantageously, the extraction is carried on after the filtered fermentation beer is adjusted to a pH of about 8.5 to 10.0 with a base, for example, sodium hydroxide. The solvent extract containing lincomycin can be concentrated to an oily material, which can then be subjected to extraction with ether and acidic methanol to give a colorless amorphous preparation of lincomycin.

The process of the subject invention facilitates the recovery of lincomycin because of the absence of lincomycin B.

It is to be understood that the process of the subject invention, though described in detail with particular reference to the novel microorganism *Streptomyces espinosus* Dietz, sp. n., NRRL 3890, is not limited to this particular microorganism or to microorganisms fully described by the cultural characteristics disclosed herein. It is intended that this invention also include other strains or mutants of the said microorganism which can be produced by procedures well known in the art, for example, by subjecting the novel microorganism to X-ray or ultraviolet radiation, nitrogen mustard, phage exposure, and the like.

Hereinafter are described non-limiting examples of the process of the present invention. All percentages are by weight and all solvent mixture portions are by volume unless otherwise noted.

EXAMPLE 1

(A) Fermentation

A soil slant of *Streptomyces espinosus* Dietz, sp. n., NRRL 3890, is used to inoculate a series of 500-ml. Erlenmeyer flasks each containing 100 ml. of seed medium consisting of the following ingredients:

|  | G./l. |
|---|---|
| Glucose monohydrate | 25 |
| Pharmamedia [1] | 25 |
| Tap water q.s. | Balance |

[1] Pharmamedia is an industrial grade of cottonseed flour produced by Traders Oil Mill Company, Fort Worth, Tex.

The flasks are grown for 3 days at 28° C., on a rotary shaker.

Five percent of the seed inoculum, described above, is used to inoculate a 500-ml. Erlenmeyer fermentation flask containing 100-ml. of sterile medium consisting of the following ingredients:

| Kay-soy [1] | 35 g./l. |
|---|---|
| Skim milk | 10 g./l. |
| Czapek Dox Broth [2] | 10 g./l. |
| CaCo$_3$ | 3 g./l. |
| Ucon LB-625 [3] | 2 ml./100 l. |
| Tap water q.s. | Balance. |

[1] Kay-soy is finely-milled fat extracted soybean meal.
[2] Czapek Dox Broth (Difco Laboratories, Detroit, Mich.
[3] Ucon LB-625 (Union Carbide Corp., Chemicals Division, 10421 W. 7 Mile Road, Detroit, Mich. 48221).

A series of 500-ml. flasks, as described above, are used to provide additional fermentation material. These flasks are sterilized, prior to inoculation, for 30 minutes at 130° C. The inoculated fermentation flasks are incubated at 28° C. on a rotary shaker (250 r.p.m., 6 cm. stroke) for 4 days.

A typical fermentation flask has the following antibacterial spectrum as determined by a standard microbiological disc plate assay.

| | Zone (mm.) | |
|---|---|---|
| Organism | 72 hours | 96 hours |
| B. subtillis | 26 | 30 |
| S. aureus | 34 | 32 |
| S. lutea | 43 | 44 |
| K. pneumoniae | 21 | 20 |
| E. coli | 0 | 0 |
| S. schottmuelleri | 0 | 0 |
| P. vulgaris | 0 | 0 |
| M. avium | 34 | 36 |

(B) Extraction

Whole fermentation beer (approximately 9 liters), obtained as described above, is filtered using diatomaceous earth as a filter aid. The filter cake is washed with 1 l. of water and the wash is combined with the clear beer. The clear beer-wash (7.2 l.) is adjusted to pH 8.8 and extracted 3 times with methylene chloride using one-third of clear beer volume each time. The methylene chloride extracts are combined and then concentrated to dryness to give an oily material. This material is dissolved in 500 ml. of ether and the solution is mixed with 5 ml. of 1 N methanolic hydrogen chloride from which lincomycin precipitates out as a colorless amorphous material; yield 450 mg. This preparation is characterized by thin layer chromatography using silica gel G (Merck A.G., Darmstadt) as a support and methyl ethyl ketone-acetone-water (186:52:20 v./v.) as the solvent. The preparation is also characterized by using infrared and nuclear magnetic resonance spectroscopy. All of these characterization tests show the preparation is lincomycin and that there is no detectable lincomycin B in the preparation.

The amount of lincomycin B in a normal fermentation of *Streptomyces lincolnensis* var. *lincolnensis* will vary with the media composition, incubation time and temperature, aeration, etc. Under normal operating conditions amounts of lincomycin B in such a fermentation will range from 5 to 10% of the total lincomycin present. The lincomycin B is removed by repeated recrystallization of the lincomycin product in suitable solvents, for example, water acetone mixtures, or water lower alcohol mixtures. Since the process of the subject invention does not produce lincomycin B, these recrystallizations are unnecessary.

We claim:

1. A process for preparing the antibiotic lincomycin which comprises cultivating *Streptomyces espinosus* Dietz, sp. n., having the identifying characteristics of NRRL 3890 and mutants thereof, in an aqueous nutrient medium under aerobic conditions until substantial antibiotic activity is imparted to said medium by the production of lincomycin.

2. A process, according to claim 1, wherein said aqueous nutrient medium contains a source of assimilable carbohydrate and assimilable nitrogen.

3. A process, according to claim 1, wherein said lincomycin is isolated from the fermentation broth.

No references cited.

JOSEPH M. GOLIAN, Primary Examiner

UNITED STATES PATENT OFFICE
CERTIFICATE OF CORRECTION

Patent No. 3,697,380                    Dated January 10, 1973

Inventor(s) A. D. Argoudelis, et al.

It is certified that error appears in the above-identified patent and that said Letters Patent are hereby corrected as shown below:

Column 2, line 20, for "(no control (glucose)" read -- (no carbon compound added); good growth on the positive control (glucose) --; Column 2, line 25, for "45° C.; good" read -- 45° C., 55° C.; good --; Column 2, line 26; for "25° C." read -- 24° C. --; Column 2, line 40, for "restangular" read -- rectangular --. Column 3, line 3, for "603-608].)" read -- 603-608]. --.

Signed and sealed this 22nd day of May 1973.

(SEAL)
Attest:

EDWARD M. FLETCHER, JR.                 ROBERT GOTTSCHALK
Attesting Officer                       Commissioner of Patents